H. P. LA BORDE.
FASTENING DEVICE.
APPLICATION FILED FEB. 25, 1922.
1,430,238.
Patented Sept. 26, 1922.
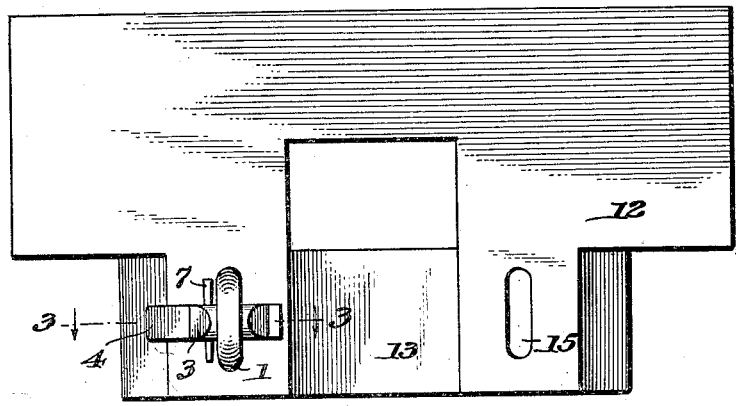
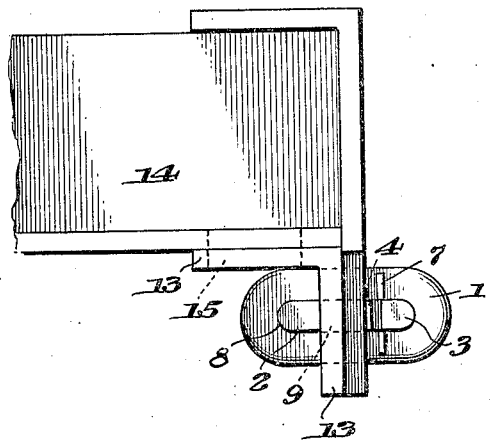
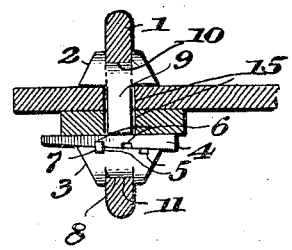
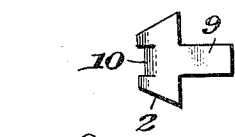
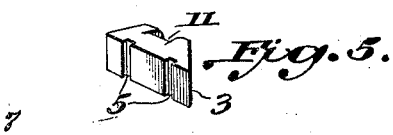
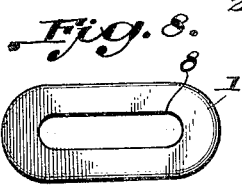
Inventor;
Hillard P. La Borde
By [signature] his Atty.

Patented Sept. 26, 1922.

1,430,238

UNITED STATES PATENT OFFICE.

HILLARD P. LA BORDE, OF DRIFTWOOD, PENNSYLVANIA.

FASTENING DEVICE.

Application filed February 25, 1922. Serial No. 539,299.

*To all whom it may concern:*

Be it known that I, HILLARD P. LA BORDE, a citizen of the United States, residing at Driftwood, in the county of Cameron and State of Pennsylvania, have invented certain new and useful Improvements in Fastening Devices, of which the following is a specification.

This invention relates to fastening devices intended to be used as substitutes for bolts and nuts.

My object is to provide an improved fastening device of simple form, great strength and durability, few parts, and capable of easy assembly or taking down which will be adapted for use in any position or location and on any structure where it is necessary to fasten together parts, particularly plates, beams, sills, irons, or the like.

My purpose, more particularly, is to provide an improved fastening device to be used in lieu of bolts on a railroad car for the purpose of securing draft pans, carrying irons, grab irons, ladder treads, etc., as a substitute for bolts which are at present commonly used for these purposes. My purpose is to provide a fastening device which may be more quickly put together to secure the parts which it is intended to fasten, and more quickly taken apart than is possible with bolts and nuts, while also more securely fastening the parts together than can be done with the ordinary bolt and nut.

The present fastening device permits the repairing of grab irons or ladder treads with a great saving of labor, especially on loaded cars, as the work may be done from the outside of the car and the use of the present fastening device lessens the danger of working under cars as it can be adjusted in much less time than is required to replace bolts and nuts. Furthermore, the invention is designed to afford a more permanent fastening than the bolt and nut as it embodies features whereby accidental loosening of the members of the device is practically impossible; furthermore, the present invention does away with the necessity for using a special tool such as a wrench, as it may be fixed in position or removed by the use of merely a cold chisel and hammer.

Whereas from twenty-four to thirty bolts and nuts are required ordinarily to equip a railroad car with carrying irons and draft pans, by using the present fastening device the number of fastening devices is reduced to from twelve to sixteen.

The invention comprises an open link, abutment blocks cooperating therewith, and a wedge adapted for use to draw the device tightly into position to clamp the plates or other parts together. In addition, I prefer to employ special locking means for the wedge.

It is only necessary to provide in the plates or parts to be fastened suitable slots of proper size for the passage therethrough of the link in order to apply the fastening device.

One embodiment of the invention is shown in the accompanying drawings and is described specifically in the following specification but it is to be understood that I do not limit the invention to the details of the construction shown and described as it is susceptible of modification, nor is the invention limited to the use of the special securing means for the wedge, except where specified in the claims as it is possible to bend down the end of the wedge in some instances and thereby dispense with the special fastening means.

The link may be heated and applied while hot to the parts it is intended to fasten, so that when it shrinks it will make a tighter joint, if desired.

While the invention is shown as used in connection with the end sill, draw sill, and front carrying iron of a railroad car, it is to be understood that this is merely for purposes of illustration and not in limitation of the use to which the fastening device may be put.

In the accompanying drawings:

Figure 1 is a front elevation showing the invention in use on the end sill of a railroad car.

Fig. 2 is a side elevation thereof, dotted lines representing a slot for another fastening device.

Fig. 3 is a cross section on the line 3—3, Fig. 1.

Fig. 4 is a detail plan view of one of the abutments.

Fig. 5 is a detail perspective view of the other abutment.

Fig. 6 is a similar view of the wedge.
Fig. 7 is a similar view of the locking key; and
Fig. 8 is a plan view of the link.

The fastening device embodies an open link 1, abutment blocks 2 and 3, and a wedge 4. Preferably, in addition to the foregoing parts, special locking means is provided for the wedge, comprising cross notches 5 in the abutment lock 3, 6 in the wedge 4, and a tapered key 7 which is received in registering notches 5 and 6. By using the special locking connection, the wedge 4 cannot slip out of place. I do not, however, limit the invention to the use of the special locking notches and key except where stated in the claims as the end of the wedge 4 may be clinched after said wedge has been driven tightly into position.

The link 1 is flat and has a slot 8 whose walls are parallel.

The abutment 2 is in the form of a head of general T shape, extending out on opposite sides of the link 1 and having its shank 9 of substantially the same width as the slit 8 and of a length adapting it to be engaged by the wedge 4. This shank, by its engagement with the walls of the slot in the structure through which the link passes, strengthens the fastening and prevents any possibility of tilting of the abutments 2 and 3 or their disengagement from the link. The abutment 2 affords a wide bearing surface for engagement with one side of the structure whose parts are fastened together. A groove 10 in the abutment 9 straddles the link at the end of the slot 8 and assists in maintaining the abutment in position.

The abutment 3 extends out on opposite sides of the link 1 and like the abutment 2, is provided with a groove or channel 11 which causes said abutment to straddle the link at the end of the slot 8.

The wedge 4 is of a width adapting it to engage the walls of the slot 8 and of a thickness causing it to tightly hold the abutments 2 and 3 against the ends of the link so that they cannot become displaced. The wedge bears directly against the face of the construction to which the fastening device is applied.

Preferably the notches 5 and 6 and locking key 7 will be provided so that when the wedge 4 is driven tightly home, the key 7 may be driven into registering notches 5 and 6 to insure against displacement of the wedge 4.

Referring to Figures 1 and 2, illustration is given of the manner in which the fastening device may be used on the sills and carrying iron at the end of a rail-road car but it is to be understood that this is only one of many uses to which the invention may be put. The end sill appears at 12, the front carrying iron is shown at 13 and the draw sill appears at 14. Slots 15 are provided in the parts of the construction which are to be fastened together. The link 1, with the abutment 2 in position is passed through the slots 15. The abutment 3 is then slid through the slot 8 and the wedge 4 is driven home between the abutment 3 and the outer face of the sill. The wedge may then be clinched down, if no locking key 7 is provided but if the locking key 7 is used, it will be inserted in the notches 5 and 6 and clinching of the wedge is then not necessary.

If no locking key 7 is used, a chisel and hammer can readily be employed for the purpose of knocking out the wedge when it is desired to effect a repair or disconnect the fastening device. If the key 7 is employed, it is only necessary to withdraw it and knock out the wedge 4 in order to release the fastening.

I claim:

1. A fastening device comprising an open link, abutment blocks extending through the link and engaged with the respective ends thereof, and a wedge extending through the link in engagement with one of the abutment blocks.

2. A fastening device comprising an open link, an abutment block of general T shape whose head extends through the link and is engaged with one end thereof and whose shank is disposed inside of the link, and a wedge extending through the link beyond the end of the stem of the abutment block aforesaid.

3. A fastening device comprising an open link, an abutment block of general T shape whose head extends through the link and is engaged with one end thereof and whose shank is disposed inside of the link, another abutment block extending through the link and engaged with the opposite end thereof, and a wedge extending through the link which is engaged with the abutment block last named and is located between it and the end of the stem of the first-named abutment.

4. A fastening device comprising an open link, an abutment block of general T shape whose head extends through the link and is engaged with one end thereof and whose shank is disposed inside of the link, another abutment block extending through the link and engaged with the opposite end thereof, and a wedge extending through the link which is engaged with the abutment block last named and is located between it and the end of the stem of the first-named abutment, and locking means engaged with the wedge and the abutment adjacent thereto preventing the wedge from accidental displacement.

5. A fastening device comprising an open link, abutment blocks extending through the link and each having a channel or groove receiving the end portions of the link, and means for securing the link and abutment blocks in position.

6. A fastening device comprising an open link, abutment blocks extending through the link and each having a channel or groove receiving the end portions of the link, and a wedge extending through the link which is engaged with one of the abutment blocks aforesaid.

In testimony whereof I affix my signature.

HILLARD P. LA BORDE.